(12) United States Patent
Kung et al.

(10) Patent No.: US 11,516,568 B1
(45) Date of Patent: Nov. 29, 2022

(54) WIRELESS MICROPHONE STRUCTURE

(71) Applicant: Chiayo Electronics Co., Ltd., Chiayi (TW)

(72) Inventors: Te-Wei Kung, Chiayi (TW); Yu-Chang Chiang, Chiayi (TW); Yu-Chen Chang, Chiayi (TW); Shi-Ka Tseng, Chiayi (TW); Hann-Sheng Huang, Chiayi (TW)

(73) Assignee: Chiayo Electronics Co., Ltd., Chiayi (TW)

( * ) Notice: Subject to any disclaimer, the term of this patent is extended or adjusted under 35 U.S.C. 154(b) by 16 days.

(21) Appl. No.: 17/323,128

(22) Filed: May 18, 2021

(51) Int. Cl.
*H04R 1/08* (2006.01)
*H04R 3/00* (2006.01)
*H02J 7/00* (2006.01)
*G06F 3/16* (2006.01)
*H04M 1/725* (2021.01)

(52) U.S. Cl.
CPC .............. *H04R 1/08* (2013.01); *G06F 3/162* (2013.01); *H02J 7/0044* (2013.01); *H04R 3/00* (2013.01); *H04M 1/725* (2013.01); *H04R 2420/07* (2013.01)

(58) Field of Classification Search
CPC .................. H04B 1/3816; H04B 1/385; H04B 2001/3855; H04B 1/0343; H04B 1/0483; H04B 1/088; H04B 1/1607; H04B 3/06; H04R 5/033; H04R 1/028; H04R 2420/07; H04R 1/08; H04R 1/1008; H04R 1/1016; H04R 1/1041; H04R 2201/40; H04R 2225/43; H04R 2460/01; H04R 25/554; H04R 1/24; H04R 15/00; H04R 17/00; H04R 19/005; H04R 19/02; H04R 19/04; H04R 2201/003; H04R 23/002; H04R 3/00; H04R 5/00; H04R 7/06; H04R 9/063; H04R 9/08; H04N 21/42203; H04N 21/43635; H04N 21/439; H04N 21/4436; H04N 1/212; H04N 5/2251; H04N 5/2252; H04N 5/2256; H04N 5/23296; H04N 5/247; H04N 5/77; H04N 7/183; H04N 5/225; H04N 5/225251; H04N 5/23293
USPC ......................................................... 381/122
See application file for complete search history.

(56) References Cited

U.S. PATENT DOCUMENTS 10,129,626 B1 * 11/2018 Jung ....................... H02J 7/342
11,284,181 B2 * 3/2022 Schoeck .............. H04R 1/1041
(Continued)

*Primary Examiner* — Lun-See Lao
(74) *Attorney, Agent, or Firm* — Karin L. Williams; Alan D. Kamrath; Mayer & Williams PC

(57) ABSTRACT

A wireless microphone structure includes a wireless microphone, a power bank, and a wireless receiver. The wireless receiver is electrically connected with a cell phone and an electronic appliance respectively by a cell phone transmission port and a sound source transmission port, so that the wireless microphone provides a sound source signal to the cell phone and the electronic appliance. The power bank has a top face provided with a recessed charging seat and a bottom face provided with a retaining groove. The wireless microphone is mounted on the charging seat by magnetically attractive connection. The cell phone transmission port protrudes from the top of the wireless receiver and is inserted into and positioned in the retaining groove. The power bank charges the wireless microphone and the wireless receiver constantly after the power bank is charged.

2 Claims, 6 Drawing Sheets

(56) References Cited

U.S. PATENT DOCUMENTS

| | | | |
|---|---|---|---|
| 2013/0148839 A1* | 6/2013 | Stevinson | H04R 1/1033 381/384 |
| 2015/0373448 A1* | 12/2015 | Shaffer | H04R 1/1025 381/74 |
| 2019/0157894 A1* | 5/2019 | Shalaby | H01R 27/02 |
| 2022/0110218 A1* | 4/2022 | Bustamante | H05K 5/0286 |

\* cited by examiner

WIRELESS MICROPHONE STRUCTURE

BACKGROUND OF THE INVENTION

1. Field of the Invention

The present invention relates to a microphone and, more particularly, to a wireless microphone structure.

2. Description of the Related Art

With the rise of webcasting, more and more users are focusing on the operation of the video recording function. The sound source signal or audio recording signal is the most important factor during the video recording process so that the film has beautiful pictures and clear acoustic effects. The conventional electronic appliance, including the cell phone, the digital camera, the video camera and the notebook computer (or laptop), can often achieve a good photographic quality at any time by changing the focus. However, it is extremely inadequate for the conventional electronic appliance to capture the audio signals. That is because the microphone of the conventional electronic appliance adopts a built-in design. In such a manner, when the video recorder is away from the screen character (such as the host) with a determined distance, the audio receiving effect is poor due to interference of noises, thereby decreasing the acoustic quality. In addition, the recorded volume is too low due to the long distance. A wireless microphone is used to provide an audio recording function to the electronic appliance. Thus, the host holds the wireless microphone which transmits the audio signal to the electronic appliance that is distant from the host, so as to achieve a better video recording effect. However, the conventional wireless microphone cannot regulate the volume and the acoustic quality of the audio signal so that the audio signal is easily interrupted by noise interference, thereby decreasing the acoustic quality. In addition, the accessories, such as the cable, the wireless receiver or the like, of the conventional wireless microphone are separated from each other and cannot be integrated, so that the user has to search for the accessories of the conventional wireless microphone in the backpack, thereby causing inconvenience to the user.

BRIEF SUMMARY OF THE INVENTION

In accordance with the present invention, there is provided a wireless microphone structure comprising a wireless microphone, a power bank, a wireless receiver, and a transmission module. The wireless microphone, the power bank, and the wireless receiver are connected serially from top to bottom. The transmission module includes a cell phone transmission port and a sound source transmission port. The wireless receiver is electrically connected with a cell phone and an electronic appliance respectively by the cell phone transmission port and the sound source transmission port of the transmission module, so that the wireless microphone provides a sound source signal to the cell phone and the electronic appliance respectively. The electronic appliance includes a digital camera, a camera or a notebook computer. The power bank has a top face provided with a recessed charging seat. The power bank is provided with a plurality of first contacts and a plurality of second contacts. The power bank has a bottom face provided with a retaining groove. The power bank has a back face provided with a screw hole. The power bank is provided with a back plate extending downward from the back face of the power bank. The wireless microphone is mounted on the charging seat of the power bank by magnetically attractive connection. The wireless microphone is provided with a plurality of third contacts touching the first contacts of the power bank so that the wireless microphone is charged by the power bank. The wireless receiver has a shape corresponding to a downward extending shape of the back plate of the power bank. The wireless receiver is provided with a plurality of fourth contacts touching the second contacts of the power bank so that the wireless receiver is charged by the power bank. The wireless receiver includes a sound receiving monitoring hole, a volume adjusting knob and a tone adjusting knob. The cell phone transmission port protrudes from a top of the wireless receiver and is inserted into and positioned in the retaining groove of the power bank. The power bank charges the wireless microphone and the wireless receiver constantly after the power bank is charged. The wireless microphone, the power bank, and the wireless receiver are connected serially to construct a storage state, to prevent the wireless microphone, the power bank, and the wireless receiver from being detached from each other.

The electronic appliance includes a hot shoe holder, and a hot shoe mounted on the hot shoe holder. The hot shoe is provided with a threaded rod screwed into the screw hole of the power bank. The power bank is mounted on the hot shoe holder of the electronic appliance by the hot shoe. The wireless receiver is combined with the power bank. A sound source cable is connected between the sound source transmission ports of the wireless receiver and the electronic appliance. Thus, the wireless receiver receives the sound source signal recorded by the wireless microphone when the electronic appliance is operating.

According to the primary advantage of the present invention, the wireless microphone, the power bank, and the wireless receiver are connected so that the wireless microphone and the wireless receiver are charged by the power bank and have a sufficient electric power constantly. The wireless receiver is electrically connected with the cell phone or the electronic appliance respectively by the cell phone transmission port or the sound source transmission port, so that the wireless receiver receives the sound source signal recorded by the wireless microphone when the cell phone or the electronic appliance proceeds in video recording. The tone and volume are regulated to enhance the acoustic quality, and to reduce interference of noise.

In addition, the wireless microphone, the power bank, and the wireless receiver are connected serially from top to bottom so that the wireless microphone structure has a compact state, and is stored and carried easily and conveniently. Further, the wireless microphone is mounted on the charging seat of the power bank by magnetically attractive connection, and the cell phone transmission port of the transmission module is inserted into the retaining groove of the power bank, so that the wireless microphone, the power bank, and the wireless receiver are connected exactly and will not be detached from each other, to facilitate the user taking out the wireless microphone structure.

Further, the fourth contacts of the wireless receiver are in contact with the second contacts of the power bank so that the wireless receiver is charged by the power bank. The threaded rod is screwed into the screw hole of the power bank so that the power bank is mounted on the hot shoe holder of the electronic appliance. The wireless receiver and the electronic appliance are connected electrically by the sound source transmission ports. Thus, the wireless receiver is charged by the power bank and has a sufficient electric power to receive the sound source signal recorded by the wireless microphone when the electronic appliance is operating.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
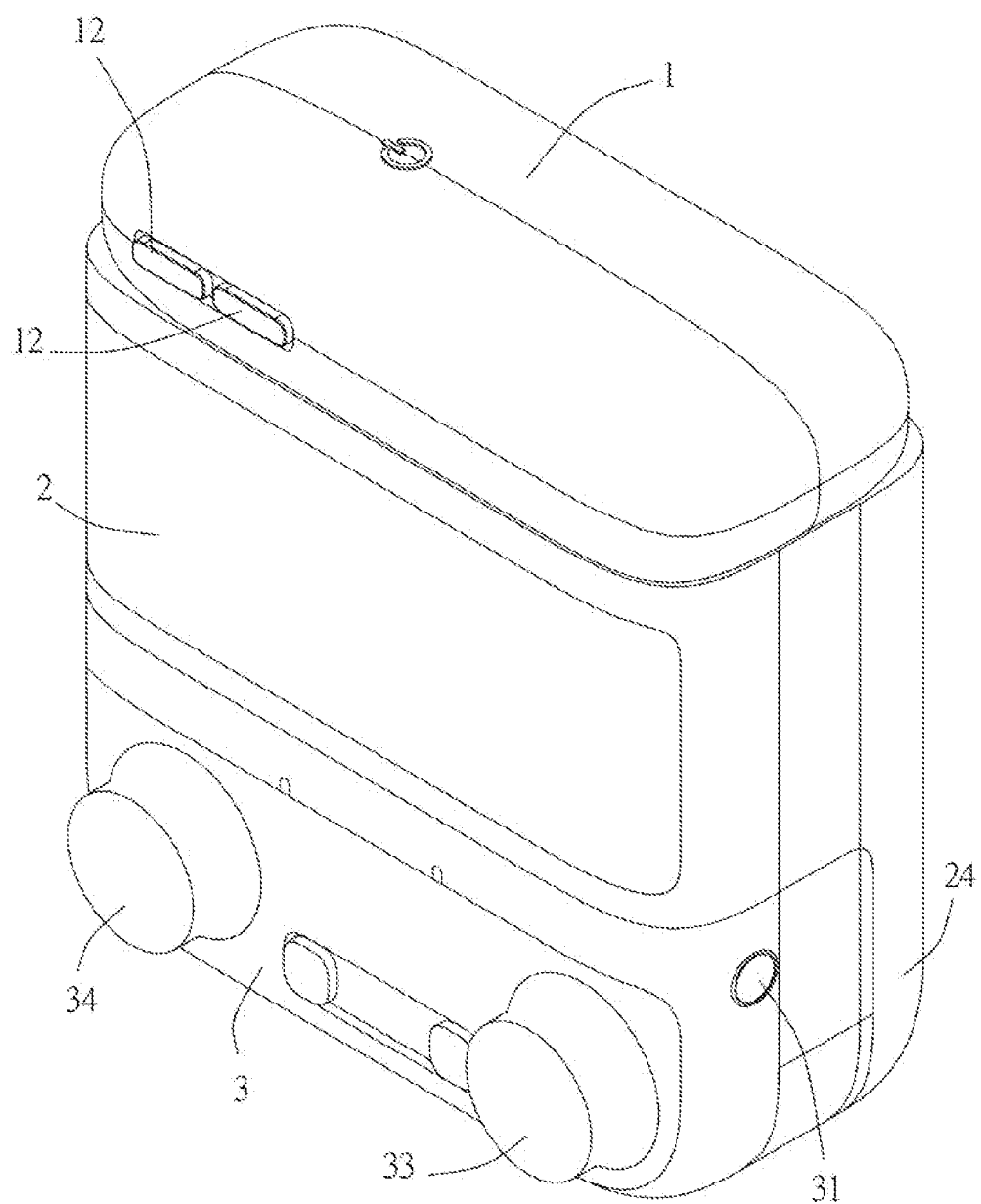
FIG. 1 is a perspective view of a wireless microphone structure in accordance with the preferred embodiment of the present invention.
Figure 2:
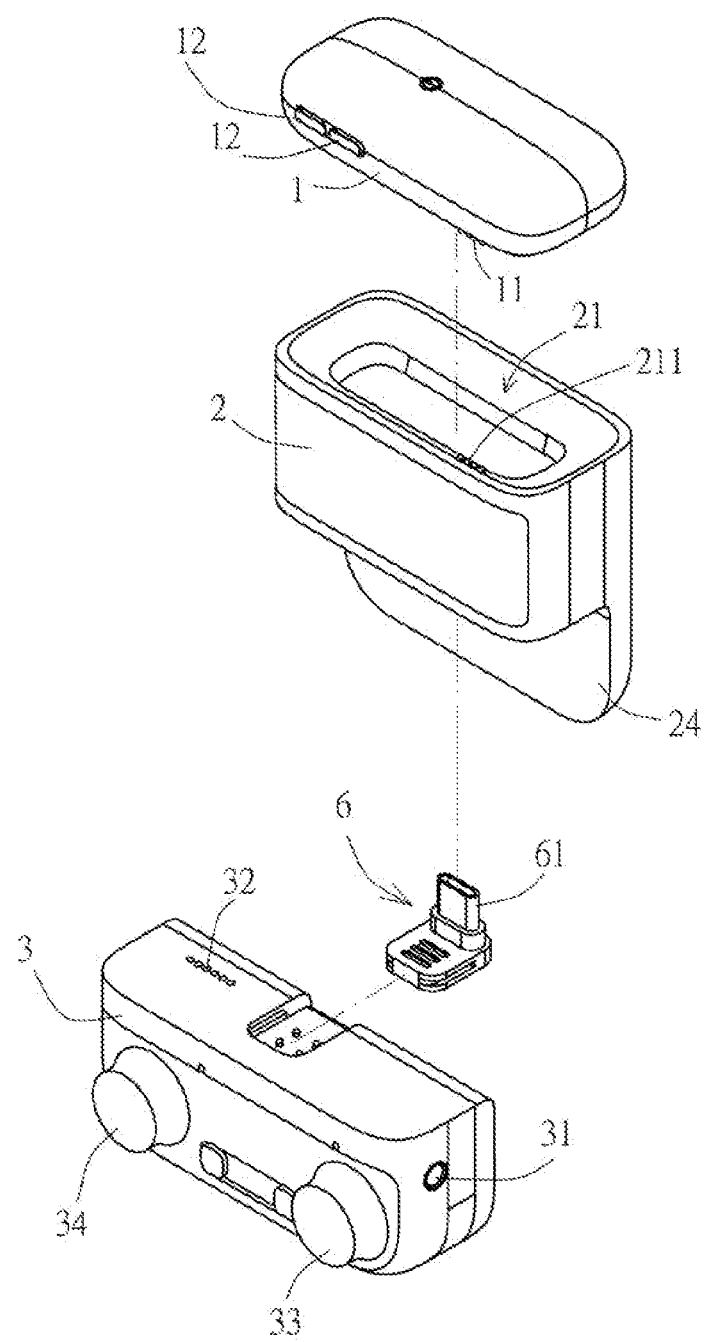
FIG. 2 is an exploded perspective view of the wireless microphone structure in accordance with the preferred embodiment of the present invention.
Figure 3:
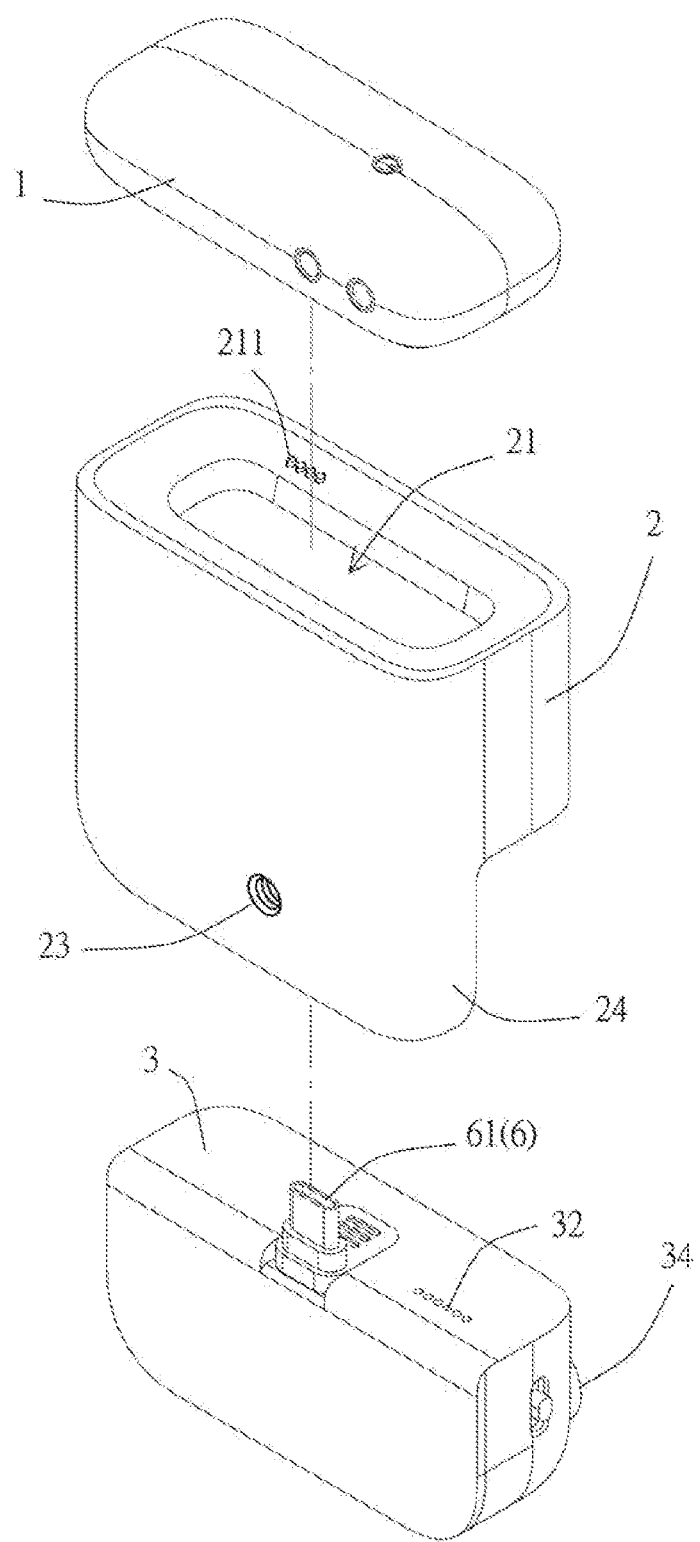
FIG. 3 is a partial exploded perspective view of the wireless microphone structure in accordance with the preferred embodiment of the present invention.
Figure 4:
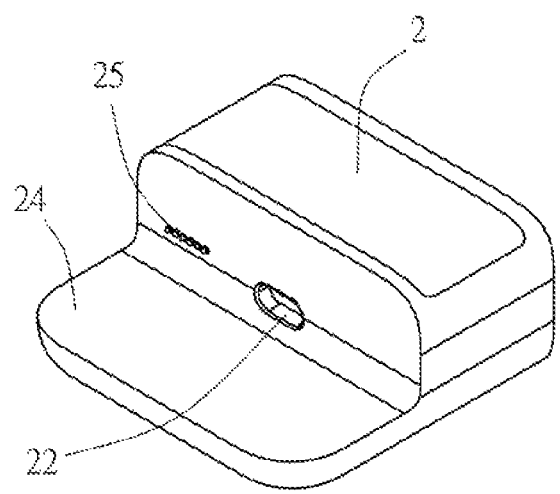
FIG. 4 is a perspective view of a power bank of the wireless microphone structure in accordance with the preferred embodiment of the present invention.

Referring to FIGS. 1-6, a wireless microphone structure in accordance with the preferred embodiment of the present invention comprises a wireless microphone 1, a power bank (or mobile power supply) 2, a wireless receiver 3, and a transmission module 6. The wireless microphone 1, the power bank 2, and the wireless receiver 3 are connected serially from top to bottom. The transmission module 6 includes a cell phone transmission port 61 mounted on the wireless receiver 3 and a sound source (or audio or acoustic) transmission port 62 (see FIG. 6) mounted on the wireless receiver 3. The wireless receiver 3 is electrically connected with a cell phone 4 and an electronic appliance 5 respectively by the cell phone transmission port 61 and the sound source transmission port 62 of the transmission module 6, so that the wireless microphone 1 provides a good sound source signal to the cell phone 4 and the electronic appliance 5 respectively, thereby enhancing the acoustic receiving effect.

In the preferred embodiment of the present invention, the electronic appliance 5 includes a digital camera, a camera or a notebook computer.

The power bank 2 has a top face provided with a recessed charging seat 21. The power bank 2 is provided with a plurality of first contacts 211 and a plurality of second contacts 25. The power bank 2 has a bottom face provided with a retaining groove 22. The power bank 2 has a back face provided with a screw hole 23. The power bank 2 is provided with a back plate 24 extending downward from the back face of the power bank 2.

The wireless microphone 1 is mounted on the charging seat 21 of the power bank 2 by magnetically attractive connection. The wireless microphone 1 is provided with a plurality of third contacts 11 touching the first contacts 211 of the power bank 2 so that the wireless microphone 1 is charged by the power bank 2. The wireless microphone 1 is provided with a plurality of volume adjusting buttons 12.

The wireless receiver 3 has a shape corresponding to a downward extending shape of the back plate 24 of the power bank 2. Preferably, the wireless receiver 3 is received in and flush with a cavity defined between the back plate 24 and the power bank 2. The wireless receiver 3 is provided with a plurality of fourth contacts 32 touching the second contacts 25 of the power bank 2 so that the wireless receiver 3 is charged by the power bank 2. The wireless receiver 3 includes a sound receiving monitoring hole 31, a volume adjusting knob 33 and a tone (or acoustic quality) adjusting knob 34.

The cell phone transmission port 61 of the transmission module 6 protrudes from a top of the wireless receiver 3 and is inserted into and positioned in the retaining groove 22 of the power bank 2.

In assembly, the transmission module 6 is mounted on the wireless receiver 3, with the cell phone transmission port 61 of the transmission module 6 protruding from the top of the wireless receiver 3. Then, the power bank 2 is mounted on the wireless receiver 3, with the cell phone transmission port 61 of the transmission module 6 being inserted into and positioned in the retaining groove 22 of the power bank 2. At this time, the fourth contacts 32 of the wireless receiver 3 are in contact with the second contacts 25 of the power bank 2 so that the wireless receiver 3 is charged by the power bank 2. Then, the wireless microphone 1 is mounted on the charging seat 21 of the power bank 2 by magnetically attractive connection. At this time, the third contacts 11 of the wireless microphone 1 are in contact with the first contacts 211 of the charging seat 21 of the power bank 2 so that the wireless microphone 1 is charged by the power bank 2. Thus, the power bank 2 charges the wireless microphone 1 and the wireless receiver 3 constantly after the power bank 2 is fully charged.

In such a manner, the wireless microphone 1, the power bank 2, and the wireless receiver 3 are connected serially from top to bottom so that the wireless microphone 1, the power bank 2, and the wireless receiver 3 are stacked together and integrated to construct the wireless microphone structure with a compact integrated construction, thereby facilitating user storing and carrying the wireless microphone structure. In addition, the wireless microphone 1 is mounted on the charging seat 21 of the power bank 2 by magnetically attractive connection, and the cell phone transmission port 61 of the transmission module 6 is inserted into and positioned in the retaining groove 22 of the power bank 2, so that the wireless microphone 1, the power bank 2, and the wireless receiver 3 are connected exactly and will not be detached from each other. Further, the wireless receiver 3 has a shape corresponding that of the back plate 24 of the power bank 2 so that the back plate 24 of the power bank 2 protects and prevent the wireless receiver 3 from being damaged by an external force.

Figure 5:
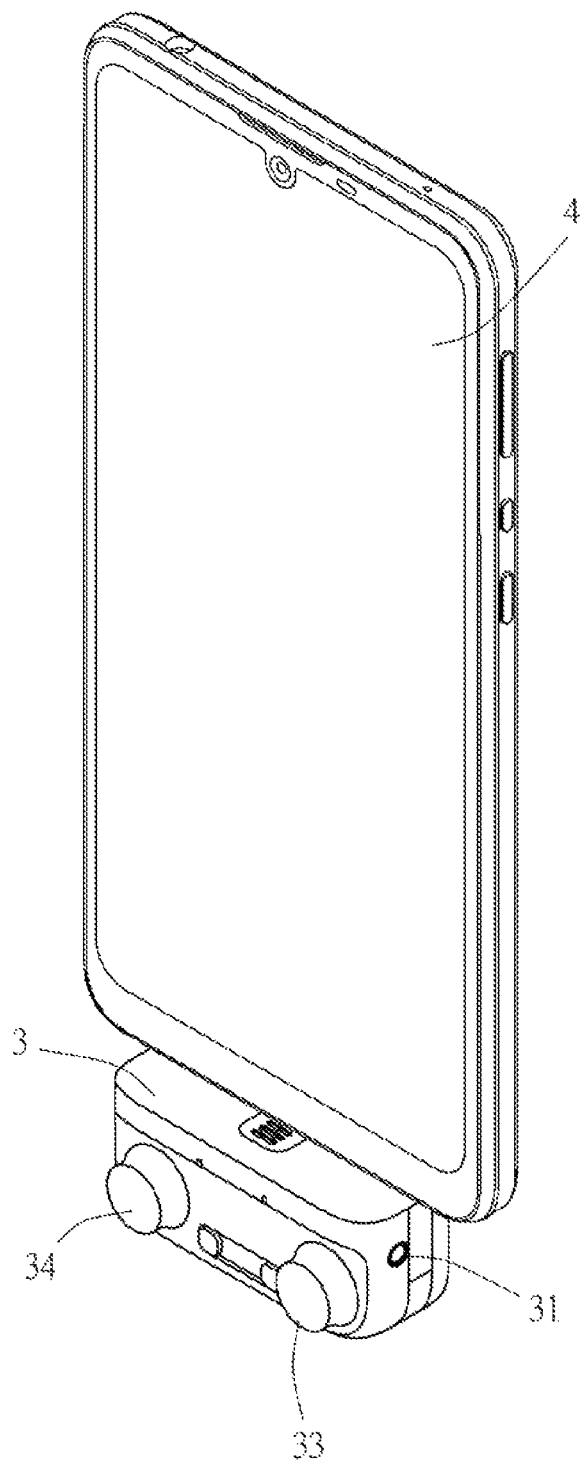
FIG. 5 is a schematic perspective view showing the wireless microphone structure available for a cell phone.

In operation, referring to FIG. 5 with reference to FIGS. 1-4, when the wireless microphone structure is used for a video recording function of the cell phone 4, the wireless receiver 3 is removed from the power bank 2. The cell phone transmission port 61 of the transmission module 6 is inserted into the cell phone 4 so that the wireless receiver 3 is electrically connected with a cell phone 4. Thus, after the wireless microphone 1 and the wireless receiver 3 are started and matched, the wireless receiver 3 receives the sound source signal recorded by the wireless microphone 1, thereby enhancing the acoustic quality, and reducing a noise interference. At this time, the sound receiving monitoring hole 31 is externally connected with an earphone (or a headset) to monitor the quality of the sound source signal, the volume adjusting knob 33 regulates the volume, and the tone adjusting knob 34 regulates the acoustic quality. In addition, the volume adjusting buttons 12 of the wireless microphone 1 can also be used to regulate the volume.

It is to be noted that, the cell phone transmission port 61 of the wireless receiver 3 is assembled by a locking mechanism and has different specifications to fit cell phones of different specifications.

Figure 6:
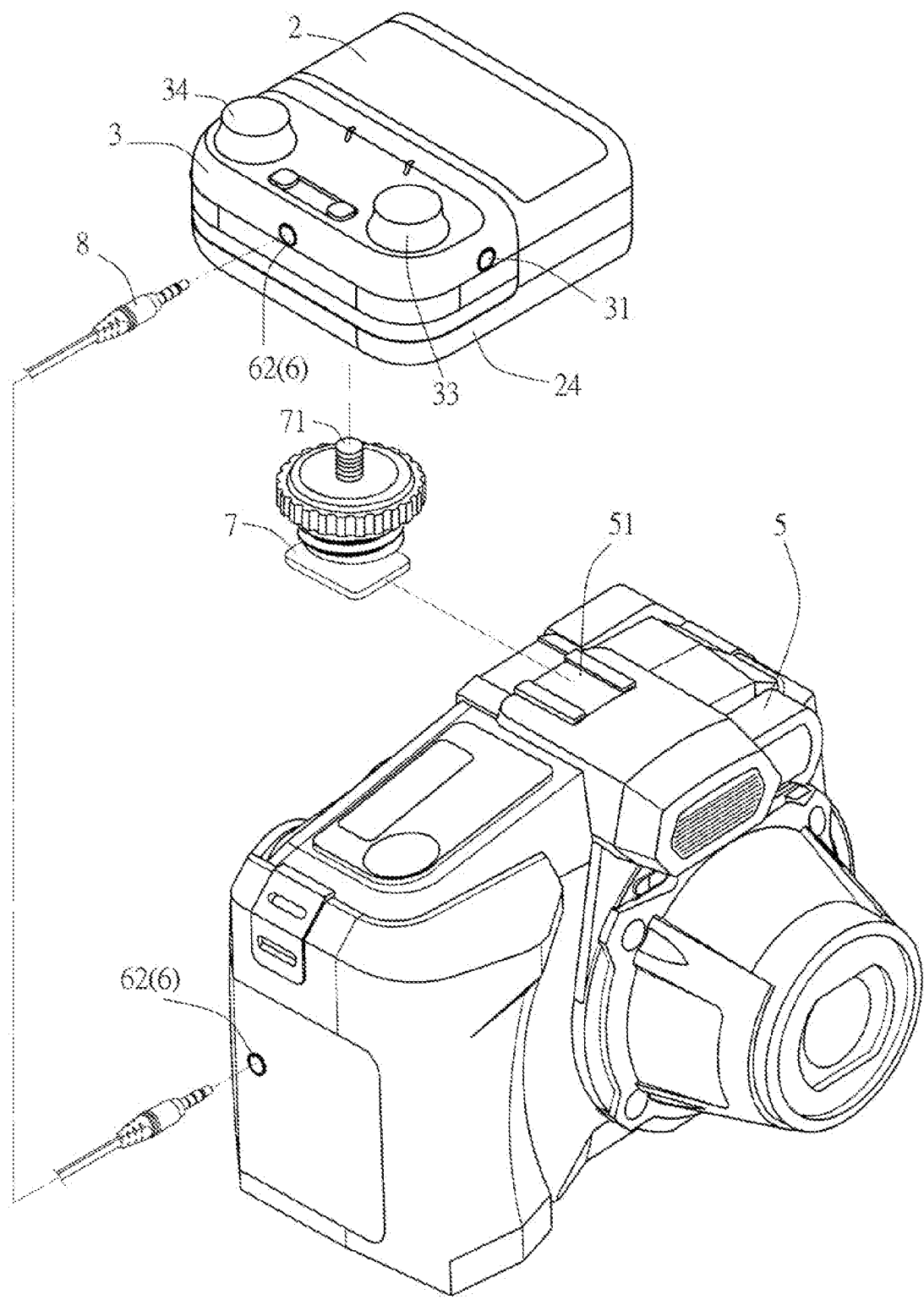
FIG. 6 is a schematic exploded perspective view showing the wireless microphone structure available for an electronic appliance.

Alternatively, referring to FIG. 6 with reference to FIGS. 1-4, the wireless microphone structure is used for the electronic appliance 5. The electronic appliance 5 includes a hot shoe holder 51, and a hot shoe 7 mounted on the hot shoe holder 51. The hot shoe 7 is provided with a threaded rod 71 screwed into the screw hole 23 of the power bank 2 to attach the power bank 2 to the hot shoe 7. Thus, the power bank 2 is mounted on the hot shoe holder 51 of the electronic appliance 5 by the hot shoe 7. The wireless receiver 3 is combined with the power bank 2. A sound source cable 8 is connected between the sound source transmission ports 62 of the wireless receiver 3 and the electronic appliance 5. Thus, the wireless receiver 3 is charged by the power bank 2 and has an enough electric power to receive the sound source signal recorded by the wireless microphone 1 when the electronic appliance 5 is operating or video recording.

Accordingly, the wireless microphone 1, the power bank 2, and the wireless receiver 3 are connected so that the wireless microphone 1 and the wireless receiver 3 are charged by the power bank 2 and have a sufficient electric power constantly. The wireless receiver 3 is electrically connected with the cell phone 4 or the electronic appliance 5 respectively by the cell phone transmission port 61 or the sound source transmission port 62, so that the wireless receiver 3 receives the sound source signal recorded by the wireless microphone 1 when the cell phone 4 or the electronic appliance 5 proceeds in video recording. The tone and volume are regulated to enhance the acoustic quality, and to reduce interference of noise.

In addition, the wireless microphone 1, the power bank 2, and the wireless receiver 3 are connected serially from top to bottom so that the wireless microphone structure has a compact state, and is stored and carried easily and conveniently. Further, the wireless microphone 1 is mounted on the charging seat 21 of the power bank 2 by magnetically attractive connection, and the cell phone transmission port 61 of the transmission module 6 is inserted into the retaining groove 22 of the power bank 2, so that the wireless microphone 1, the power bank 2, and the wireless receiver 3 are connected exactly and will not be detached from each other, to facilitate the user taking out the wireless microphone structure.

Further, the fourth contacts 32 of the wireless receiver 3 are in contact with the second contacts 25 of the power bank 2 so that the wireless receiver 3 is charged by the power bank 2. The threaded rod 71 is screwed into the screw hole 23 of the power bank 2 so that the power bank 2 is mounted on the hot shoe holder 51 of the electronic appliance 5. The wireless receiver 3 and the electronic appliance 5 are connected electrically by the sound source transmission ports 62. Thus, the wireless receiver 3 is charged by the power bank 2 and has a sufficient electric power to receive the sound source signal recorded by the wireless microphone 1 when the electronic appliance 5 is operating.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wireless microphone structure comprising:
a wireless microphone, a power bank, a wireless receiver, and a transmission module;
wherein:
the wireless microphone, the power bank, and the wireless receiver are connected serially from top to bottom;
the transmission module includes a cell phone transmission port and a sound source transmission port;
the wireless receiver is electrically connected with a cell phone and an electronic appliance respectively by the cell phone transmission port and the sound source transmission port of the transmission module, so that the wireless microphone provides a sound source signal to the cell phone and the electronic appliance respectively;
the electronic appliance includes a digital camera, a camera or a notebook computer;
the power bank has a top face provided with a recessed charging seat;
the power bank is provided with a plurality of first contacts and a plurality of second contacts;
the power bank has a bottom face provided with a retaining groove;
the power bank has a back face provided with a screw hole;
the power bank is provided with a back plate extending downward from the back face of the power bank;
the wireless microphone is mounted on the charging seat of the power bank by magnetically attractive connection;
the wireless microphone is provided with a plurality of third contacts touching the first contacts of the power bank so that the wireless microphone is charged by the power bank;
the wireless receiver has a shape corresponding to a downward extending shape of the back plate of the power bank;
the wireless receiver is provided with a plurality of fourth contacts touching the second contacts of the power bank so that the wireless receiver is charged by the power bank;
the wireless receiver includes a sound receiving monitoring hole, a volume adjusting knob and a tone adjusting knob;
the cell phone transmission port protrudes from a top of the wireless receiver and is inserted into and positioned in the retaining groove of the power bank;
the power bank charges the wireless microphone and the wireless receiver constantly after the power bank is charged; and
the wireless microphone, the power bank, and the wireless receiver are connected serially to construct a storage state, to prevent the wireless microphone, the power bank, and the wireless receiver from being detached from each other.

2. The wireless microphone structure as claimed in claim 1, wherein:
the electronic appliance includes a hot shoe holder, and a hot shoe mounted on the hot shoe holder;
the hot shoe is provided with a threaded rod screwed into the screw hole of the power bank;
the power bank is mounted on the hot shoe holder of the electronic appliance by the hot shoe;
the wireless receiver is combined with the power bank;

a sound source cable is connected between the sound source transmission ports of the wireless receiver and the electronic appliance;

the wireless receiver receives the sound source signal recorded by the wireless microphone when the electronic appliance is operating.

\* \* \* \* \*